Dec. 13, 1927.  J. W. DODD  1,652,400
BRAKE
Filed Oct. 29, 1924   4 Sheets-Sheet 2
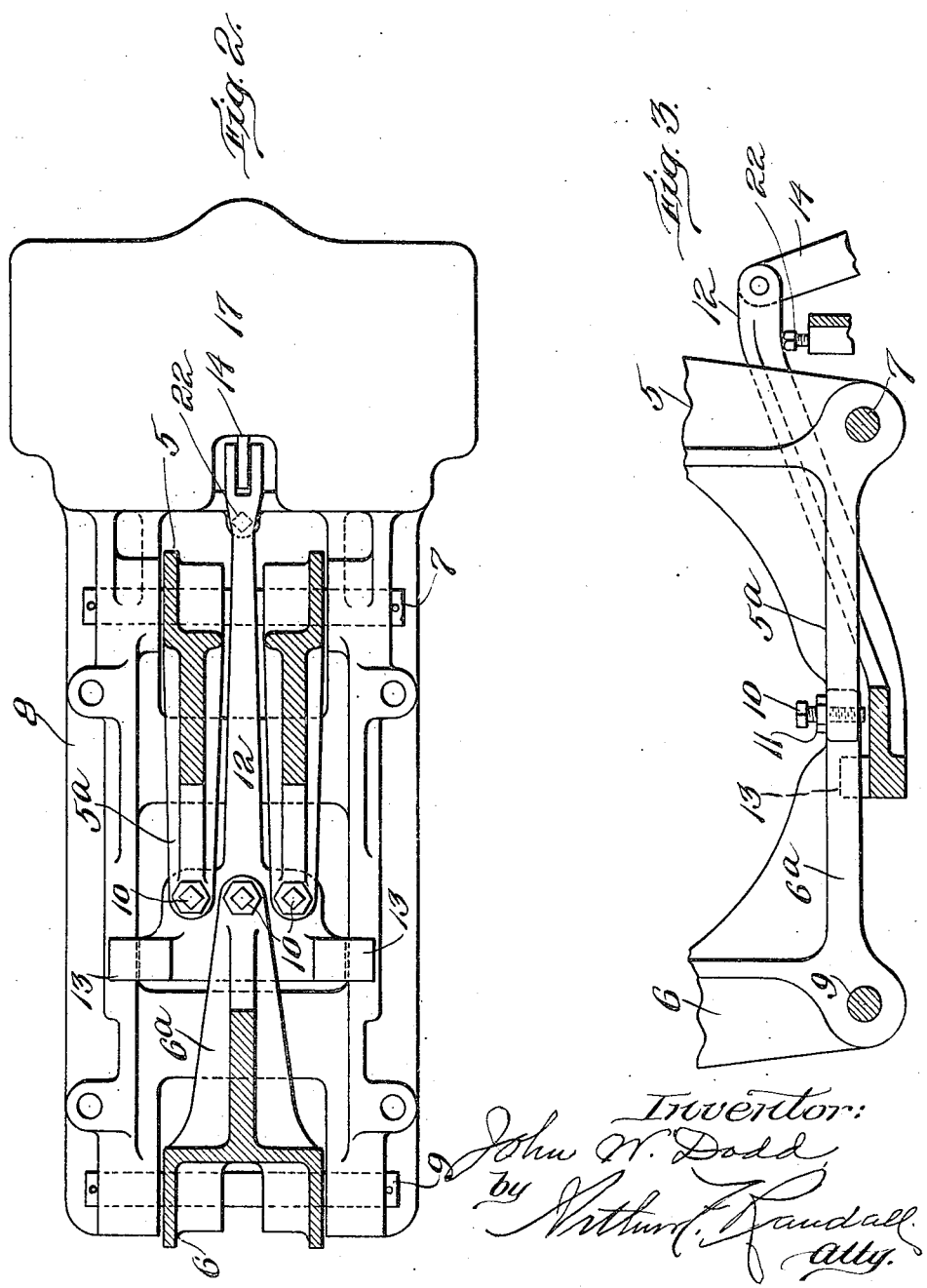

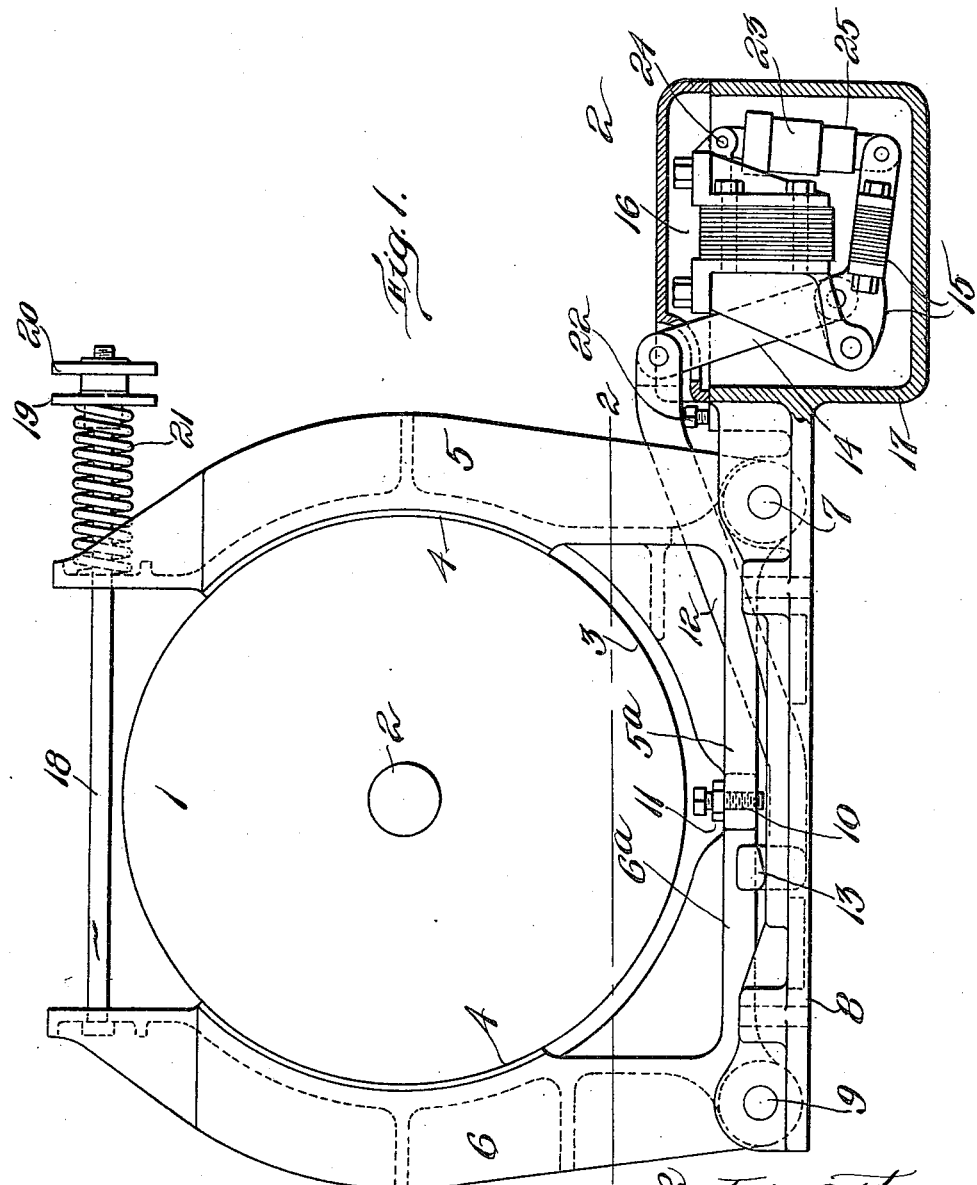

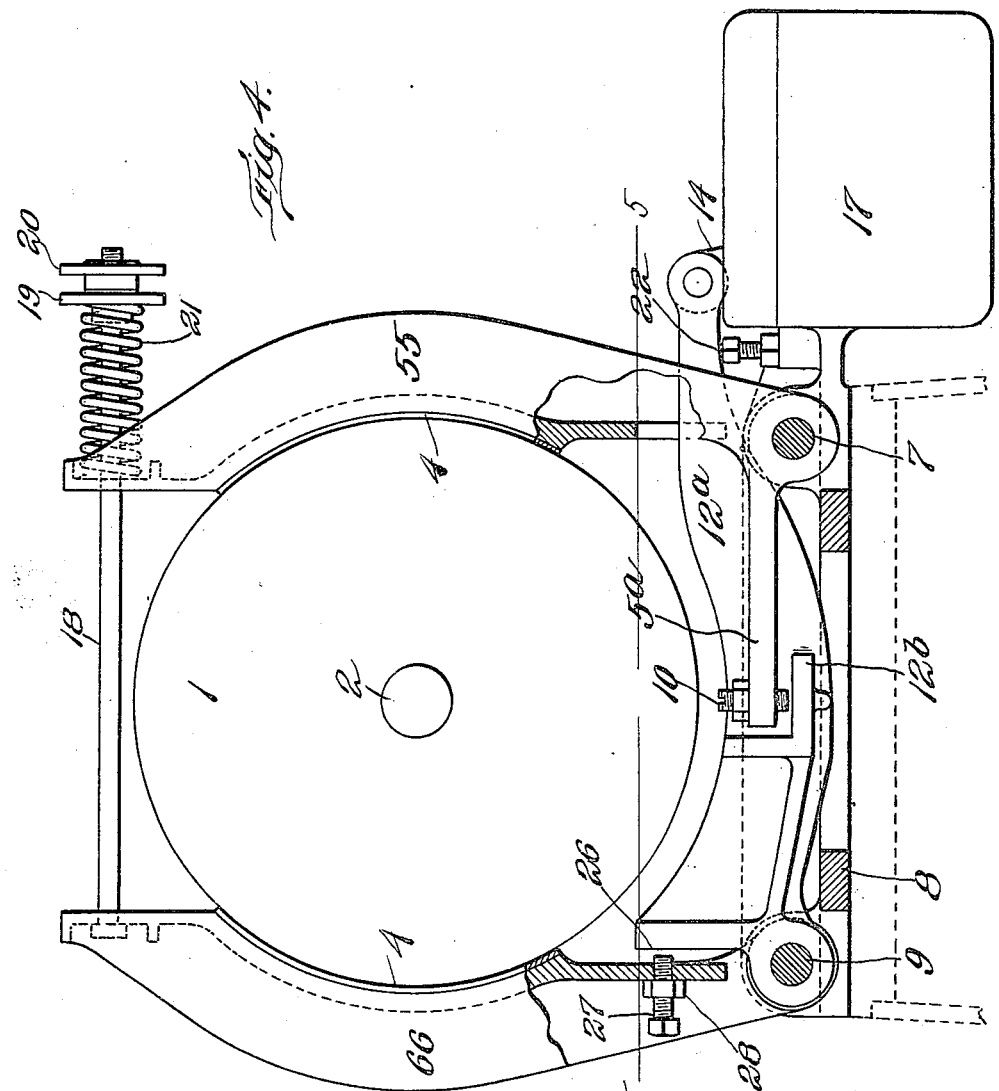

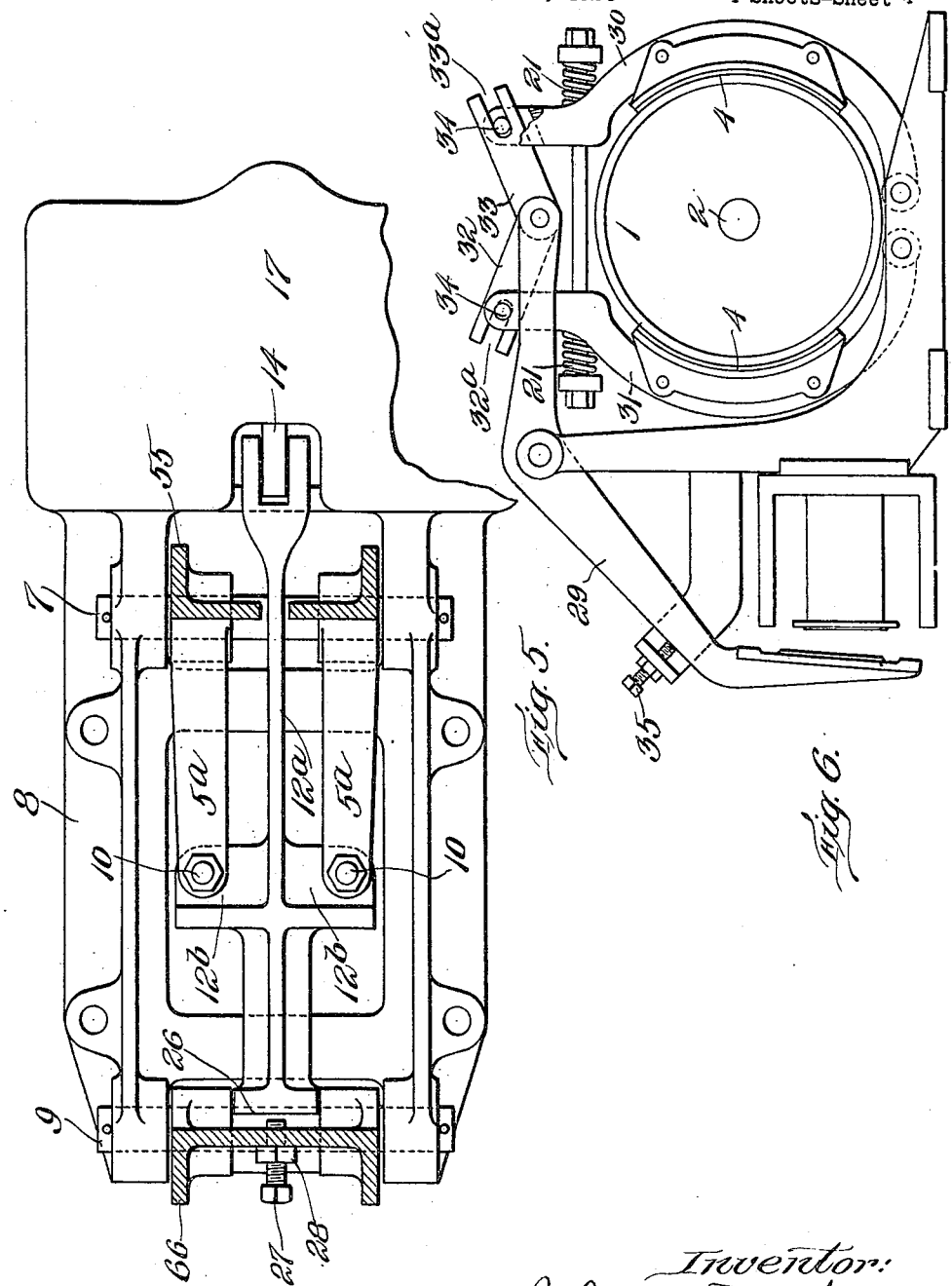

Patented Dec. 13, 1927.

1,652,400

UNITED STATES PATENT OFFICE.

JOHN W. DODD, OF BROOKLINE, MASSACHUSETTS, ASSIGNOR TO GEORGE T. McLAUTH-LIN COMPANY, OF BOSTON, MASSACHUSETTS, A CORPORATION OF RHODE ISLAND.

BRAKE.

Application filed October 29, 1924. Serial No. 746,489.

My invention relates to electromagnet brakes for elevators, hoisting apparatus and the like, and has for its object to provide an improved brake of this class.

One type of brake of the class referred to has heretofore been constructed with a pair of pivoted brake arms engaging opposite sides of the brake wheel and both connected through links with a single main operating lever carrying, or connected with, the armature of an electromagnet, which latter acted through said lever and links to move the arms away from the wheel to free the same when the electromagnet was energized, one or more brake-setting springs being provided to move the arms in the opposite direction toward and into engagement with the wheel to hold the latter against rotation when the electromagnet was de-energized. My invention has particular reference to brakes of this type. Heretofore, this single armature lever has always been connected with the brake arms through the medium of links or the like as stated, so as to move in unison with them.

When, in the operation of brakes of this kind the springs force the brake shoes against the wheel, the armature is at the same time moved in a direction away from the magnet until the movement thereof is abruptly terminated by the engagement of the brake shoes with the wheel, this movement being imparted to the armature by the brake lever at a magnified velocity. Since the weight, speed and inertia of the armature are considerable at the moment of the completion of this movement an objectionable shock is produced that is injurious to the parts, particularly the brake shoes, resulting in uneven action of the brake shoes and non-uniform retardation of the rotating parts. The use of a dash-pot to check or control, to some extent, the movement of the magnet armature in this direction is objectionable as it introduces an element which might cause delay or failure in the action of the brake.

Another disadvantageous feature of such brakes as heretofore constructed, has been that any wear of the brake shoes or other parts due to use, served to increase the air gap between the armature and magnet so that the working range of the armature was exceeded and the magnet would fail to operate and would at the same time, in the case of an alternating current magnet, draw or use excessive current. With some of the constructions heretofore proposed this adjustment was difficult to effect and with others no provision for such adjustment was made.

My invention obviates the above noted objections and provides a brake machanism of the character described wherein the brake arms and the main armature lever, or equivalent device, are constructed and associated so as to permit of independent movement of either in one direction relatively to the other, the movements of the brake arms away from the wheel being limited or arrested by means independent of the armature lever, preferably by the brake setting springs, while the movement of the armature lever accompanying the movements of the brake shoes toward the wheel, is limited or arrested by means independent of said arms and wheel which preferably acts upon the lever near its free end, instead of near, at, or through its hub as heretofore, thus preventing any shock to the lever being transmitted to the brake shoes. This construction avoids imposing objectionable shocks upon the brake shoes through the abrupt arrest of the movement of the armature lever when the brake is set, through the capacity for independent movement between the shoes and the main armature lever.

It is also a feature of my improved brake mechanism, in its best form, that the main armature lever co-operates directly with both brake shoes instead of through links, or equivalent devices as heretofore.

Other features of my invention are hereinafter pointed out.

Figure 1 is an elevation, partly in section, of a brake mechanism constructed in accordance with my invention.

Figure 2 is a section on line 2—2 of Fig. 1.

Figure 3 is a detail hereinafter referred to.

Figure 4 is a side elevation of a brake mechanism embodying another form of my invention.

Figure 5 is a section on line 5—5 of Fig. 4.

Figure 6 shows a modification.

Having reference to the drawings, 1 represents a brake wheel mounted on a shaft 2 which may be connected to any suitable mechanism such, for example, as an elevator motor or a hoist motor. The wheel 1 is provided with a periphery 3 suitable to be engaged by brake shoe linings 4 carried by a pair of upright brake arms 5 and 6. The arm 5 is part of a bell-crank lever fulcrumed at 7 on and within a base frame 8 and having two other arms $5^a$ extending substantially horizontally beneath wheel 1. The other brake arm 6 is also part of a bell-crank lever fulcrumed at 9 on and within the base frame 8, this lever being provided with a single arm $6^a$ extending substantially horizontally beneath wheel 1 with its free end disposed between the free ends of arms $5^a$. Each arm $5^a$ and $6^a$ carries near its free end, a screw 10 extending through a threaded aperture in its arm and provided with a jam nut 11 by means of which it is fixed in adjusted position. The lower ends of the screws 10 occupy positions immediately above a lever 12 which is the main armature lever of the brake mechanism through which the magnet operates the brake arms 5 and 6. This lever 12 is made T-shaped to provide two branches 13, 13 which rest and pivot upon the base frame 8 as shown in Fig. 1, the stem of said lever being connected by a link 14 with the armature 15 of an electromagnet 16 that is located within a housing 17 integral with the base frame 8. When magnet 16 is energized and its armature 15 is swung upwardly the latter acts through the link 14, armature lever 12 and screws 10 to raise the arms $5^a$ and $6^a$, thereby swinging the arms 5 and 6 away from wheel 1 and freeing the latter.

Adjacent the upper ends of the brake arms 5 and 6 is a connecting rod 18 extending through apertures in the two brake arms, one end of this rod being made with a head bearing against the arm 6 and the opposite end being threaded to receive upon it a nut 19 and a jam nut 20. Between the nut 19 and arm 5, and surrounding rod 18, is a spring 21 that is under an appropriate initial stress sufficient to cause the arms 5 and 6 to grip wheel 1 so as to prevent rotation thereof. When the arms 5 and 6 are swung apart, away from wheel 1, by lever 12 as described, spring 21 is further compressed and, when the magnet 16 is deenergized, the spring 21 throws the two arms 5 and 6 against wheel 1 simultaneously, the accompanying downward movements of the arms $5^a$ and $6^a$ acting, through the screws 10, to swing lever 12 downward toward a stop screw 22 adjustably mounted in a threaded hole in base frame 8. The screws 10 and 22 are set so that when the brake is thus set the lever 12 does not engage the stop screw 22 until after arms 5 and 6 have engaged the wheel 1 and lever 12 has moved out of contact with screws 10. It will thus be seen that the movement of lever 12 effected during the setting operation by spring 21 acting through the brake arms 5 and 6 is arrested wholly by means independent of the wheel and arms, viz, by the stop screws 22 engaging the free end of lever 12. Consequently, any shock to this lever is not communicated to the brake arms. It will be seen, also, that the lever 12 co-operates directly with the brake members 5 and 6 thus dispensing with intermediate devices such as links heretofore employed.

A dash-pot 23 pivoted at 24 to the frame of magnet 16, and a piston 25 therefor pivotally connected to the free end of the armature 15, are provided, as usual, to yieldingly retard the upward movement of armature 15.

With the construction above described wear of the brake shoes 4 through use does not affect the air gap between the armature 15 and magnet 16, such wear may, at infrequent intervals, however, call for slight adjustment of screws 10 to maintain the proper relationship between the moment of engagement between arms 5 and 6 with wheel 1 and the moment of engagement between lever 12 and stop 22. Preferably the parts are adjusted so that the brake arms engage the wheel 1 just prior to the engagement of lever 12 with stop 22. The adjustable stop screw 22 also provides for accurate positioning of the armature 15 with respect to the magnet 16.

In the form of my invention shown in Figure 4 the armature lever $12^a$ is fulcrumed loosely upon the pintle 9 on which one of the brake members, 66, is also loosely mounted, and is made, near its hub, with an upstanding arm or shoulder 26 co-operating with an adjustable abutment screw 27 mounted on said member and held in adjusted position by a jam nut 28. The opposite brake member 55 is fulcrumed on the pintle 7 and, as in Figs. 1 and 2, is constructed with two substantially horizontal arms $5^a$ equipped, near their free ends, with abutment screws 10 co-operating with shelves $12^b$ provided upon opposite sides of lever $12^a$. With this form of my invention the lever $12^a$ is of heavier and stronger construction than in Figs. 1 and 2 and the abutment screw for one of the brake members is placed in a more accessible position than in Figs. 1 and 2. The mode of operation of this form shown in Figs. 4 and 5 is the same as that of the form shown in Figs. 1 and 2.

In Fig. 6 I have embodied one of the features of my present invention in a brake mechanism of that type wherein the armature lever 29 co-operates with the two brake arms 30 and 31 through a pair of links 32 and 33. In this form the outer ends of the links 32 and 33 are not pivotally connected with the brake arms 30 and 31 as heretofore but are formed with slots 32ᵃ and 33ᵃ, respectively, whose inner ends only engage the pintles 34. A stop 35, corresponding in function with the stops 22 of the other two forms of my invention herein shown, is provided to arrest the movement, initiated by the springs 21, of the armature lever 29 after the brake shoes 4 seat upon the wheel 1 when the magnet is operated to set the brake.

What I claim is:—

1. A brake mechanism of the class described having, in combination, a brake wheel; a wheel engaging brake member; an operating member for said brake member, and means engaging said operating means to limit the brake setting movement thereof.

2. A brake mechanism of the class described having, in combination, a brake wheel; a wheel engaging brake member; an operating lever for said brake member, and a fixed stop engaging said operating lever near its free end to positively limit its brake setting movement.

3. A brake mechanism of the class described having, in combination, a brake wheel; a wheel engaging brake member; a spring for setting said brake member against said wheel; a lever operated in one direction to move said brake member away from said wheel and movable independently of said brake member in the opposite direction, and a stop engaging said lever to limit its movement in the latter direction.

4. A brake mechanism of the character described having, in combination, a brake wheel; two brake members engaging opposite sides of said wheel; a spring for setting said brake members against said wheel; an operating member moved in one direction to shift said brake members away from said wheel and movable in the opposite direction independently of said brake members; a stop to arrest the movement of the operating member in the latter direction after the brake members have engaged the brake wheel, and means for actuating said operating member.

5. A brake mechanism of the character described having, in combination, a brake wheel; a pair of brake members engaging opposite sides of said wheel; an operating member associated with said brake members so as to act thereon only when moved in a direction to unset the brake members; a spring yieldingly urging said members toward said wheel; a stop for limiting the brake setting movement of said operating member, and an electro-magnet for actuating said operating member.

6. A brake mechanism of the character described having, in combination, a brake wheel; wheel-engaging members movable toward and from said wheel; adjustable abutments carried thereby; an operating member for said brake members having direct abutting engagement with said adjustable abutments with provision for movement of said operating member independently in one direction relatively thereto and means for controlling said operating member.

7. A brake mechanism of the character described having, in combination, a brake wheel; wheel-engaging members movable toward and from said wheel; adjustable abutment screws carried thereby; an operating member for said brake members having direct abutting engagement with said screws with provision for movement of said operating member independently in one direction relatively thereto, and means for controlling said operating member.

8. A brake mechanism of the character described having, in combination, a brake wheel; wheel-engaging brake levers movable toward and from said wheel; an operating lever having direct abutting engagement with said brake levers with provision for movement of said operating lever independently in one direction relatively to said brake levers; an armature connected with said operating lever, and an electro-magnet for operating said armature.

9. A brake mechanism of the character described having, in combination, a brake wheel; wheel-engaging brake levers movable toward and from said wheel having adjustable abutment screws forming part thereof; an operating lever having direct abutting engagement with said abutment screws with provision for movement of said operating lever independently away from said screws and relatively to said brake levers; an armature connected with said operating lever, and an electromagnet for operating said armature.

10. A brake mechanism of the character described having, in combination, a brake wheel; wheel-engaging brake levers movable toward and from said wheel having adjustable abutment screws forming part thereof; an operating lever having direct abutting engagement with said abutment screws with provision for movement of said operating lever independently away from said screws and relatively to said brake levers; an armature connected with said operating lever, a stop independent of said wheel for limiting the movement of the operating lever away from said screws, and an electromagnet for operating said armature.

11. A brake mechanism of the character described having, in combination, a brake wheel; wheel-engaging brake levers movable toward and from said wheel having adjustable abutment screws forming part thereof; an operating lever having direct abutting engagement with said abutment screws with provision for movement of said operating lever independently away from said screws and relatively to said brake levers; an armature connected with said operating lever, an adjustable stop independent of said wheel for limiting the movement of the operating lever away from said screws, and an electromagnet for operating said armature.

JOHN W. DODD.